United States Patent
Smith et al.

[19]

[11] Patent Number: 5,813,830
[45] Date of Patent: Sep. 29, 1998

[54] CARBON SEAL CONTAMINANT BARRIER SYSTEM

[75] Inventors: Joseph C. Smith, Plainfield; Mark E. Bowman, New Palestine; Joseph D. Black, Brownsburg, all of Ind.

[73] Assignee: Allison Engine Company, Inc., Indianapolis, Ind.

[21] Appl. No.: 599,028

[22] Filed: Feb. 9, 1996

[51] Int. Cl.⁶ ..................................................... F04D 29/08
[52] U.S. Cl. ................... 415/170.1; 415/174.2; 415/229; 277/58; 277/192
[58] Field of Search .............................. 415/170.1, 174.2, 415/174.5, 229, 230, 231; 277/192, 157, 152, 58

[56] References Cited

U.S. PATENT DOCUMENTS

| | | |
|---|---|---|
| 1,937,461 | 11/1933 | Mylting . |
| 2,451,944 | 10/1948 | Hall . |
| 2,598,381 | 5/1952 | Hoffman . |
| 2,956,824 | 10/1960 | Kuchler et al. . |
| 2,992,842 | 7/1961 | Shevchenko et al. . |
| 3,347,553 | 10/1967 | Schweiger . |
| 3,554,661 | 1/1971 | Olgesby et al. . |
| 3,806,135 | 4/1974 | Wiese . |
| 3,955,859 | 5/1976 | Stella et al. . |
| 4,463,956 | 8/1984 | Malott . |
| 4,613,280 | 9/1986 | Tate . |
| 4,848,776 | 7/1989 | Winckler . |
| 4,917,218 | 4/1990 | Murray . |
| 4,969,652 | 11/1990 | Munson . |
| 5,018,750 | 5/1991 | Sparks et al. . |
| 5,167,487 | 12/1992 | Rock . |
| 5,272,868 | 12/1993 | Ciokajlo et al. . |
| 5,284,347 | 2/1994 | Pope . |
| 5,295,798 | 3/1994 | Maruyama et al. . |
| 5,301,957 | 4/1994 | Hwang et al. . |

FOREIGN PATENT DOCUMENTS

A77414/87  2/1989  Australia .

*Primary Examiner*—John T. Kwon
*Attorney, Agent, or Firm*—Woodard, Emhardt, Naughton, Moriarty & McNett

[57] ABSTRACT

A carbon seal contaminant barrier system for a gas turbine engine including a lip seal for wiping the surface of a rotating seal runner, and a baffle spaced from the rotating seal runner to prevent the impingement of the contaminants on the lip seal. The lip seal and the baffle are spaced axially and cooperate to minimize the contaminants passed to a carbon sealing system. The circumferential carbon sealing ring having a plurality of passages therethrough for delivering pressurized gas adjacent the carbon sealing ring. The pressurized gas being utilized to reduce the drag on the lip seal and to reduce the migration of contaminants onto the carbon seal. The barrier system being utilized to reduce the contamination of the carbon seal and prevent the inherent leakages associated therewith and the potential contamination of the environmental system of the aircraft.

35 Claims, 5 Drawing Sheets

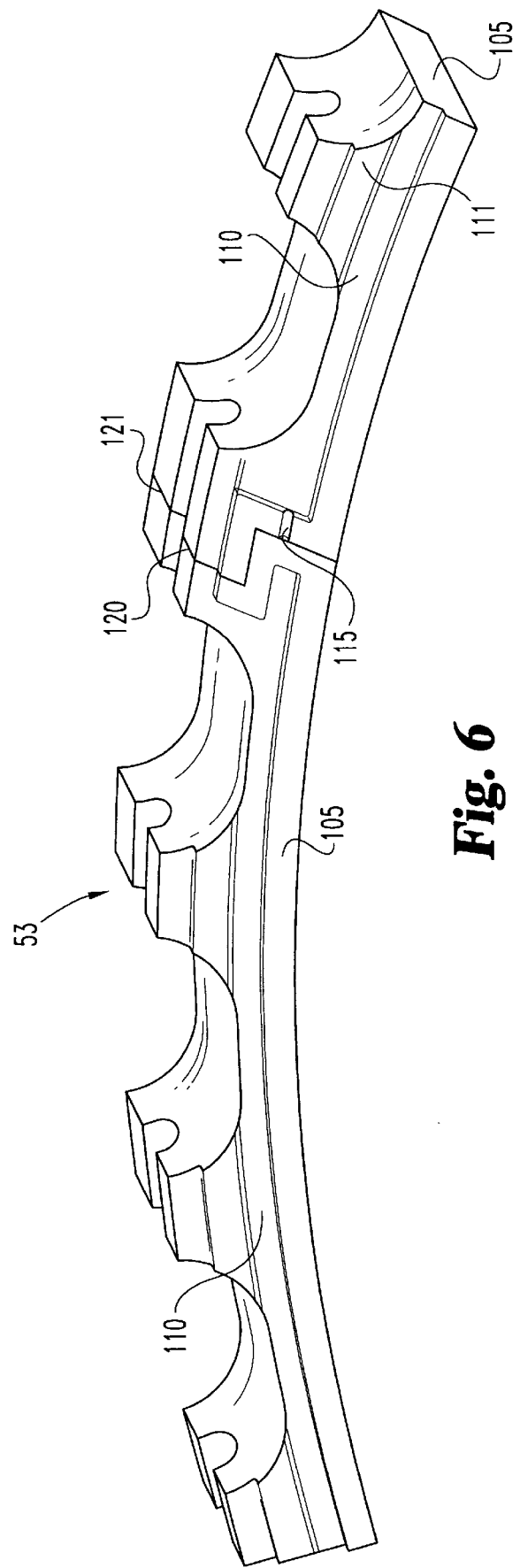

CARBON SEAL CONTAMINANT BARRIER SYSTEM

BACKGROUND OF THE INVENTION

The present invention relates generally to the design and construction of seal systems useful in a gas turbine engine. More particularly, the present invention has one application with a carbon seal system for preventing the contamination of the carbon seal system. Although the invention was developed for use in a gas turbine engine, certain applications may be outside of this field.

It is well known that a gas turbine engine integrates a compressor and a turbine having components that rotate at extremely high speeds relative to each other, and across which there are pressure differentials that make the provision of seals for minimizing fluid leakage very important. Prior designers of seal systems have generally used a sealing device consisting of a plurality of arcuate carbon material segments arranged to form a stationary carbon ring that forms a rubbing interface with a rotating seal runner.

The rubbing interface between the rotating seal runner and the carbon ring minimizes or prevents the leakage of fluid through the seal, however if the heat generated by the rubbing interface is not adequately dissipated the resulting fluid leakage at the seal interface may become excessive. The carbon seal system requires the precise geometric fit between the stationary carbon ring and the rotating seal runner to ensure that the intimate rubbing interface is obtained between the mating components. The rubbing interface between the mating components is critical to the performance of the seal, and certain tolerances associated with the seal components are measured in millionths of an inch. In order to maintain the precision geometric fit between the mating components of the rubbing interface, prior designers of carbon seal systems have typically utilized a fluid cooling medium to extract excessive heat from the seal runner.

A conventional technique utilized by designers of gas turbine engines to minimize the flow of cooling fluid onto the carbon seal is to use an integral windback in the seal housing. Persons of ordinary skill in the art will realize that a windback is generally used to pump oil away from the carbon seal, thereby evacuating the oil from the seal. A common limitation associated with windback systems is that as the oil is being evacuated away from the carbon seal, a vacuum is formed which can result in solid oil being pulled back into the seal and fluid leak occurs. Fluid leakage across the carbon seal is detrimental to the function of the engine, causing problems ranging from a hazardous condition to contamination of the aircraft environmental system. Contamination of the aircraft environmental system may result in an air-oil mist being discharged into the cockpit or passenger compartment of the aircraft, thereby rendering the environment unfriendly to pilots and passengers.

Even with a variety of earlier designs there remains a need for an improved carbon seal contaminant barrier system. The present invention satisfies this need in a novel and unobvious way.

SUMMARY OF THE INVENTION

One embodiment of the present invention contemplates a combination comprising: a gas turbine engine; a mechanical housing within the gas turbine engine; a shaft rotatably mounted within the housing; a carbon seal connected to the housing; a seal runner connected to the shaft, the seal runner arranged adjacent to the carbon seal to form a substantially fluid tight seal therebetween; a lip seal contacting the seal runner; and, a baffle spaced from the lip seal and positioned around the seal runner.

One object of one embodiment of the present invention is to provide an improved carbon seal contaminant barrier system for a gas turbine engine.

Related objects and advantages of the present invention will be apparent from the following description.

BRIEF DESCRIPTION OF THE DRAWINGS

FIG. 6 is an enlarged perspective view of a portion of the carbon sealing ring with pressurized fluid discharge aperture therein comprising a portion of the carbon seal contaminant barrier system.

DESCRIPTION OF THE PREFERRED EMBODIMENT

Figure 1:
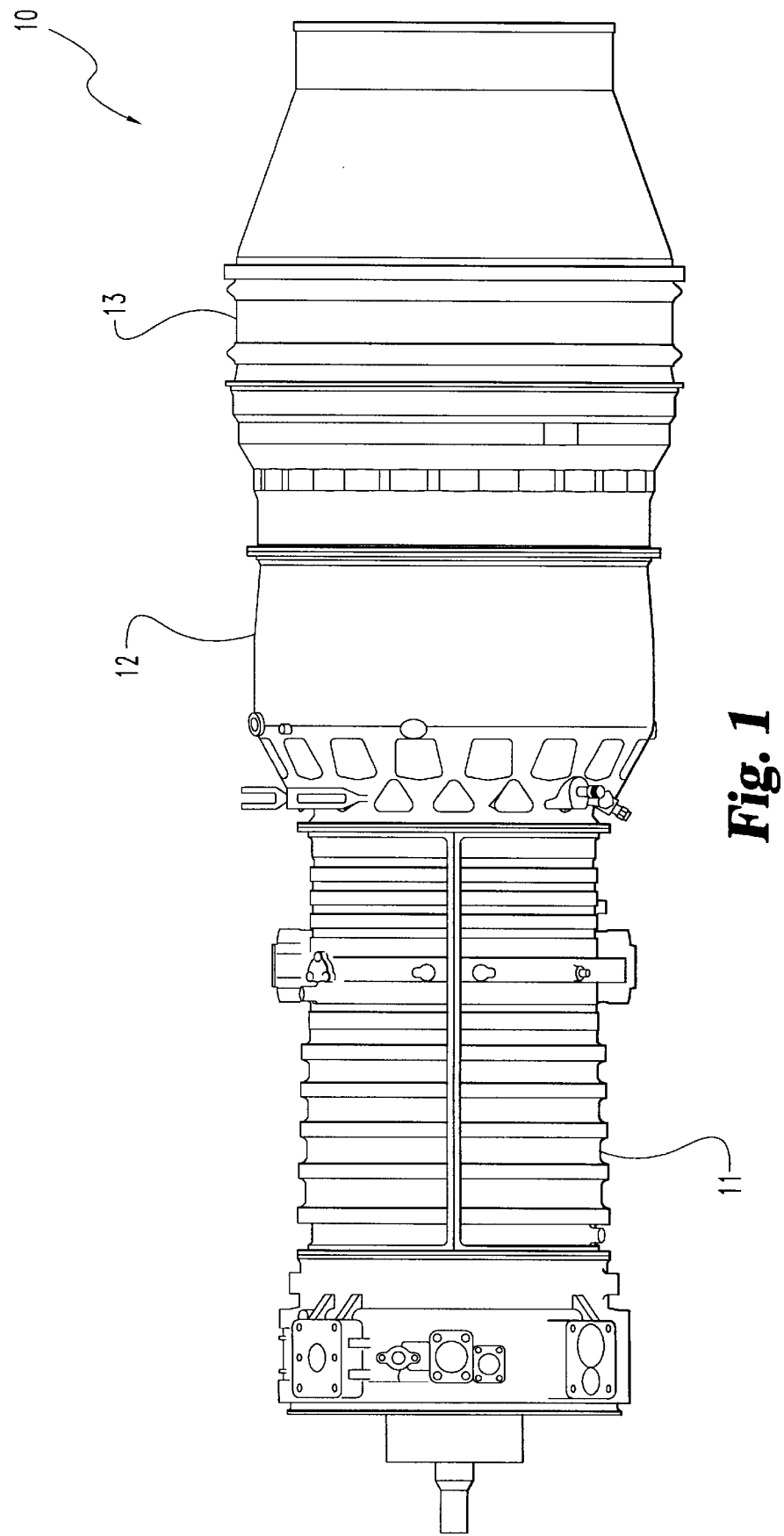
FIG. 1 is a side elevational view of a gas turbine engine utilizing one form of the present invention therein.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a gas turbine engine 10 which includes a compressor 11, a combustor 12 and a power turbine 13. Three components have been integrated together to produce an aircraft flight propulsion engine. One aircraft engine of this general type is model AE 2100 that is produced by Allison Engine Company, Inc. of Indianapolis, Ind. It is important to realize that there are a multitude of ways in which the components can be linked together. Additional compressors and turbines could be added with intercoolers connected between the compressors and reheat combustion chambers could be added between the turbines. Further, a gas turbine engine is equally well suited to be used for industrial applications. Historically, there has been wide spread application of industrial gas turbine engines, such as pumping sets for gas and oil transmission lines, electricity generation and naval propulsion.

Figure 2:
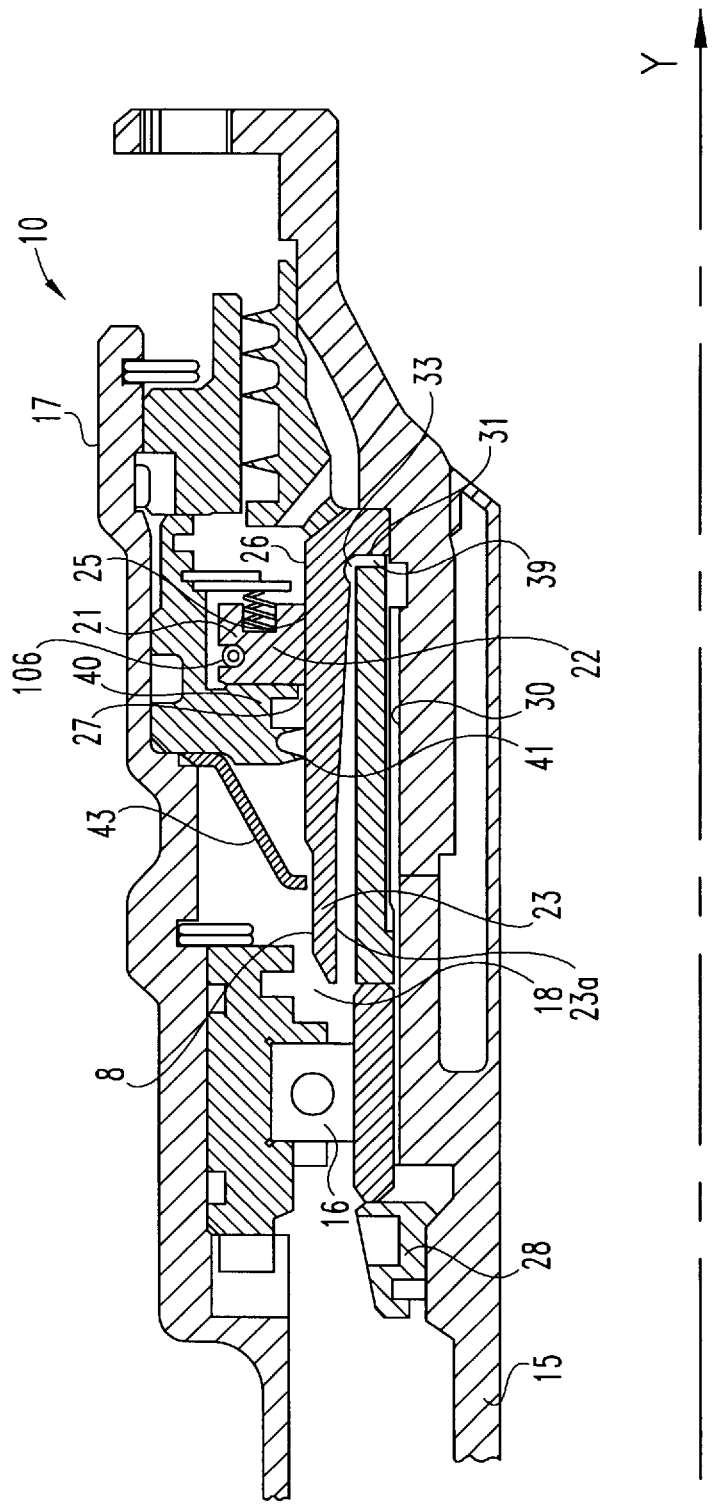
FIG. 2 is a fragmentary side elevational view in full section of the FIG. 1 gas turbine engine having a carbon seal contaminant barrier system according to one embodiment of the present invention.

With reference to FIG. 2, there is illustrated a fragmentary view in full section of gas turbine engine 10. A tubular shaft 15 is rotatably mounted within the gas turbine engine 10 about a longitudinal axis y of the engine 10. The shaft 15 is supported on a plurality of bearings (only one illustrated) that are disposed between the shaft 15 and a rigid housing 17 that forms a portion of the engine 10. One of the plurality of bearings is a bearing 16 that is coupled to the mechanical housing 17. A volume defined between the shaft 15 and the mechanical housing 17 is sump 18 in which bearing 16 is disposed.

The sump 18 functions as a reservoir for cooling fluid that is utilized to cool and lubricate the mechanical components of the gas turbine engine 10 such as bearing 16. In the preferred embodiment annular barriers (not illustrated) are attached to the front and rear of the mechanical housing to close the sump 18. Further, a plurality of seals are disposed between mechanical housing 17 and shaft 15 that is rotatably mounted within mechanical housing 17. One of the plurality of seals is sealing arrangement 21. In the preferred embodiment the sealing arrangement 21 is a carbon seal system that includes a stationary component and a rotating component.

The stationary component of the sealing arrangement 21 has a first sealing element 22 that is coupled to the mechanical housing 17. While the rotating component of the sealing arrangement 21 has a second sealing element 23 that is mechanically connected to the rotating shaft 15. It is well known that the rotating component of this sealing arrangement is known as a seal runner, and that the stationary component is known as a circumferential carbon seal. It is understood that other types of primary seals could also be used.

In the preferred embodiment the first sealing element 22 is positioned axially concentric with and radially outward from the second sealing element 23. Further, in the preferred embodiment the sealing elements 22 and 23 are arranged adjacent to each other to form a rubbing interface therebetween. A first cylindrical surface 25 is formed on the radially inward side of the first sealing element 22, and a second cylindrical surface 26 is formed on the radially outward side of the second sealing element 23. At least a portion of the cylindrical surfaces 25 and 26 are maintained in rubbing contact to form a fluid tight seal at the rubbing interface 27.

A lubrication system, which normally provides cooling fluid under pressure to lubricate and cool the moving parts of the engine, such as the bearing 16 and the second sealing element 23 delivers its fluid through a nozzle 28. The cooling fluid is pressurized by a pump (not illustrated) to a pressure of about 30 pounds per square inch gage, and delivered through nozzle 28 with sufficient kinetic energy to traverse the passageway 30 formed along shaft 15. The passageway 30 provides a pathway for the axial flow of cooling fluid to a substantially solid planar surface 31 that forms a portion of the second sealing element 23. This planar surface 31 prevents any further axial flow of the cooling fluid and helps direct the fluid to flow in a substantially radial direction. In the preferred embodiment, a plurality of openings 39 are formed on one end of the passageway 30 to allow the discharge of cooling lubricants. In the preferred embodiment the cooling fluid is an engine oil having a viscosity suited for the high temperatures associated with a gas turbine engine 10. Other types of fluid lubrication systems may be employed and the specific disclosure of the preferred embodiment is not intended to limit the types of lubrication systems which may be used in furtherance of the present invention.

In the preferred embodiment a circumferential channel 33 is formed on the radially inward surface 23a of the second sealing element 23. The radially inward surface 23a defines an outwardly sloping surface that is axially concentric with the first sealing element 22 and the second sealing element 23. This outwardly sloping surface preferably has a slope of about two degrees as measured from a reference line parallel to the central axis Y of the gas turbine engine 10.

The circumferential channel 33 extends uninterrupted around the second sealing element 23. The channel 33 is designed and constructed for receiving cooling fluid therein that has been released through the plurality of openings 39 in passageway 30. As the cooling fluid exits the openings 39 of passageway 30 it is thrown radially outward by centrifugal forces during normal engine operation. As the cooling fluid is received into channel 33 it flows circumferentially through the channel until the channel is full. When the channel 33 is full of fluid it allows the cooling fluid to escape at a plurality of points along its length. The cooling fluid is evenly distributed on the radially inward surface 23a of the second sealing element 23 and provides for substantially uniform dissipation of thermal energy therefrom. Further details regarding a circumferential flow channel, such as flow channel 33 are disclosed in commonly owned U.S. patent application Ser. No. 08/309,081, which is incorporated herein by reference.

The second sealing element 23 has an external portion 8 extending a further distance from the first sealing element 22 than the channel 33 is located from the first sealing element 22. External portion 8 is designed to minimize the volume of oil that engages the first sealing element 22. In the preferred embodiment the first sealing element 22 includes a carbon sealing element. The carbon sealing element defines an annular ring that is formed from a plurality of arcuate carbon material segments arranged in an abutting relationship.

In one form of the present invention a windback 40 is positioned radially outward from the second sealing element 23 and adjacent the first sealing element 22. Windbacks are generally known to those skilled in the art, however, windback 40 has been designed and manufactured such that there is only one thread 41. The windback 40 is utilized to assist in preventing the impingement of oil onto the first sealing element 22. Further, a fluid contaminant flow barrier 43 is disposed between the housing 17 and the rotating seal runner 23. In the preferred embodiment the fluid contaminant flow barrier 43 is an annular baffle spaced radially from seal runner 23. In the preferred embodiment, the baffle 43 is formed of sheet metal. Baffle 43 (illustrated in FIGS. 5 and 6) is connected to the mechanical housing 17 and prevented from rotation relative to the housing by an anti-rotation mechanism.

Figure 3:
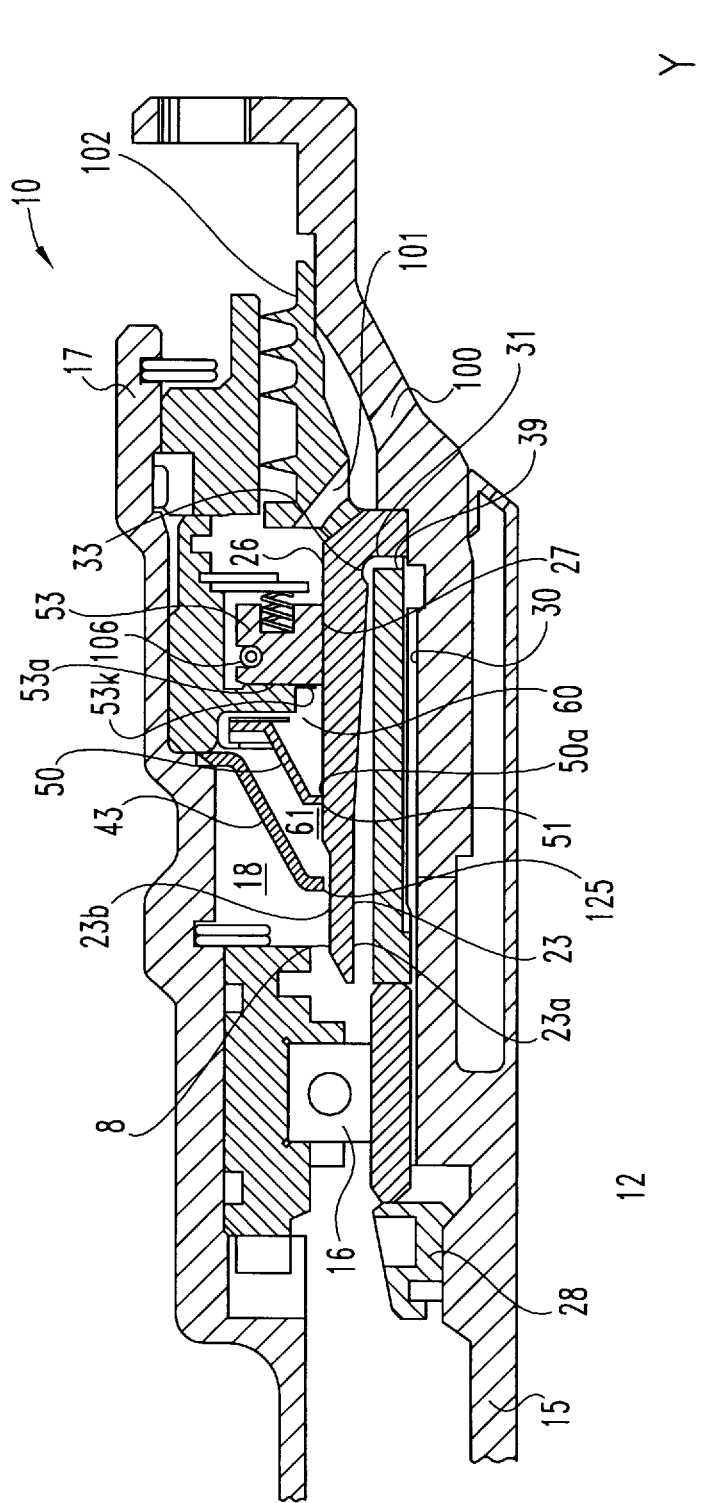
FIG. 3 is a fragmentary side elevational view in full section of the FIG. 1 gas turbine engine having a carbon seal contaminant barrier according to another embodiment of the present invention.

With reference to FIG. 3, there is illustrated a fragmentary side elevational view in section of a gas turbine engine having another embodiment of the carbon seal contaminant barrier system. FIGS. 2 and 3 are substantially identical with like numbers representing like features and distinctions therebetween will be discussed hereinafter. The fluid contaminant flow barrier 43 is positioned within the mechanical housing 17 by an interference fit. The fluid flow barrier 43 being radially spaced from seal runner 23 so as to eliminate contact between the seal runner 23 and the stationary barrier 43. An annular fluid seal 50 is disposed between the mechanical housing 17 and the outer cylindrical surface 23b of seal runner 23. In the preferred embodiment the fluid seal 50 is a lip seal having a L-shaped lip and made of TEFLON® impregnated with carbon graphite. TEFLON® is a registered trademark of E.I. DuPont De Nemours and Company of Wilmington, Del. Other annular fluid seal designs are contemplated herein, such as a hydrodynamic lip and alternative material choices such as TEFLON® filled with glass/moly and TEFLON® filled with EKONOL®. EKONOL® is a trademark of Furon of Los Alamitos, Calif. Other lip seals designs may be employed and the specific disclosure of lip seal 50 is not intended to limit the types of lip seals which may be used in furtherance of the present invention. However, it is understood that the lip seal must have the characteristics required to operate in the present environment. The lip 50a of the lip seal 50 rides on the outer cylindrical surface 23b of the seal runner 23 and wipes away solid oil that comes in contact therewith.

In the preferred embodiment a pressurized gas is discharged from the compressor through tubular shaft 15, aperture 100, aperture 101 in labryinth seal 102, and is delivered via a passageway adjacent to the face 53k of carbon sealing element 53. The discharge of the pressurized gas assists in preventing the impingement of contaminants on the carbon sealing element 53. In the preferred embodiment the gaseous fluid is air. Further, the discharge of the pressurized gas acts on the lip seal 50 in order to reduce the load associated with the lip seal 50 contacting the rotating seal runner 23. It is understood that as the engine speed increases, the pressurized gaseous supply increases. The corresponding reduction in the load associated with the lip seal 50 that is transferred to seal runner 53 decreases the incidence of the seals burning in a high speed rotary device such as a gas turbine engine 10. The pressurized gas also functions to blow contaminants away from the seal, and more particulary to blow oil away from the seal.

In the preferred embodiment pressurized gas from the compressor flows into a plurality of circumferential channels 110 formed on the planar face 111 of the arcuate carbon members 105. The gaseous flow from the compressor passes along the channels 110 formed on the individual carbon arcuate members 105 and is blocked from exiting the respective flow channel 105 by the adjoining arcuate carbon member and the mechanical housing 17. The planar surface 111 of the arcuate members 105 are in contact with an internal surface of the mechanical housing 17 and creates a fluid tight seal. A passageway 115 is formed across the planar sealing surface 111 at each of the respective joints where the respective arcuate carbon members 105 abut. The three passageways 115 allow the pressurized gas to flow between the respective abutting ends 120 and 121 of the members 105 and be discharged from the carbon ring adjacent surface 23b of the sealing element 23. Further, it is understood that in another embodiment of the present invention the carbon sealing element does not have apertures associated therewith for the pressurized discharge of gas adjacent the face of the carbon seal. Carbon sealing elements of this general type are now available from Stein Seal of Philadelphia, Pa. However, the utilization of pressurized gas to reduce the drag on lip seal 50 has been found to enhance the life of the seal.

In the preferred embodiment, the circumferential carbon seal 53 is formed of three arcuate carbon members 105 (only 2 illustrated) that interlock and are assembled between the mechanical housing 17 and the shaft 15. A circumferential tensioning spring 106 is utilized to provide a compressive force to the plurality of arcuate carbon member 105 to position them adjacent and in rubbing interface with the rotating shaft 15.

The fluid contaminant barrier 43 functions as a bulk head to prevent excited fluid from sump 18 from directly impinging onto the lip seal 50. As the lubricant passes through the narrowed annular opening 125 it is calmed as it is discharged into an annular cavity 61. Annular cavity 61 is defined by lip seal 50, baffle 43, and the rotating shaft 15. The lubricant having been discharged into cavity 61 assists in cooling and lubricating the lip 50a of lip seal 50, thereby helping to prevent deterioration of lip seal due to the high surface speeds inherent in a gas turbine engine.

Figure 5:
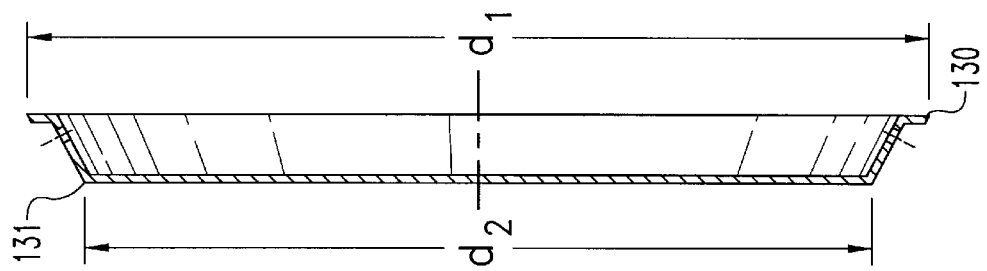
FIG. 5 is a side elevational view in full section of the FIG. 4 baffle.
Figure 4:
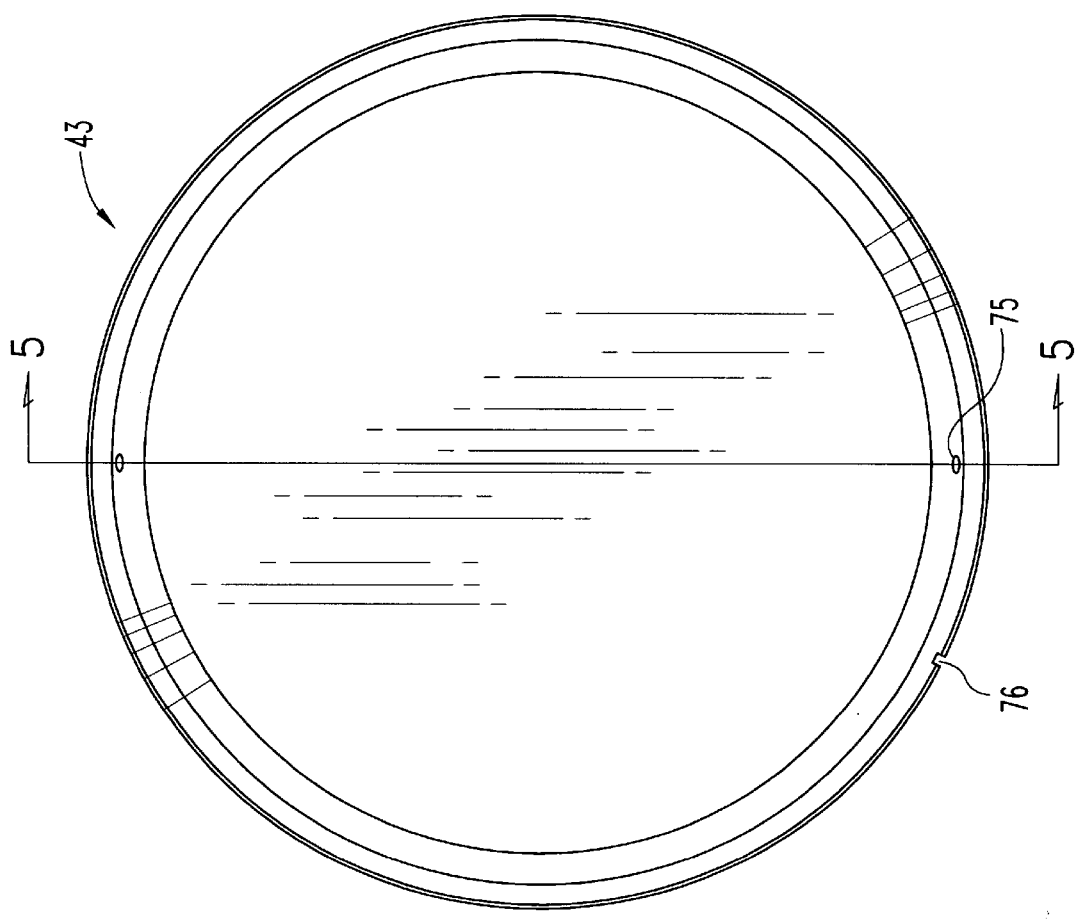
FIG. 4 is an end view of a baffle comprising a portion of the carbon seal contaminant barrier of FIG. 3.

With reference to FIGS. 4 and 5, there is illustrated the preferred embodiment of fluid contaminant barrier 43. In the preferred embodiment fluid contaminant barrier 43 is a baffle with a central aperture disposed around sealing element 23, and a fluid drain aperture 75 which allows any fluid retained within cavity 61 to drain into the sump 18 after the gas turbine engine is shut down. In the preferred embodiment the fluid drainage is a gravity fed process. Further, the baffle 43 has an anti-rotation mechanism comprising a slot 76 that receives a pin (not illustrated) therein. The pin (not illustrated) is connected to the housing 17 and engages the anti-rotation slot 76 to prevent baffle 43 from rotating. In the preferred embodiment the baffle 43 defines a annular ring having a first end 130 with a larger outside diameter d1 and a second end 131 with a smaller outside diameter d2 that are connected by a tapered cylindrical surface.

Alternate forms of the present invention are contemplated herein and are deployable in different environments within a sump 18 located near a carbon seal. The two general classes of environment are classified as an air-oil mist environment and a solid oil environment. Owing to the characteristics of these two environments, each environment may require different methods to optimize the contaminant barrier sealing system, however there is no limitation intended that a specific contaminant barrier system design can only work in a specific class of environment.

With reference to FIGS. 1–6, there will be illustrated examples of carbon seal contaminant barrier systems. In a sump environment having substantially only air-oil mist there may be no need for the entire combination of baffle, lip seal and carbon seal with pressurized air discharge. In the air-oil mist environment utilizing a contaminant barrier system without the baffle allows the air-oil mist to directly impinge upon the lip seal and cool the seal. Further, there are situations when there is not present in the sump a sufficient volume of air-oil mist to warrant the combination of the baffle, lip seal, and carbon seal with pressurized gaseous discharge; and deployment thereof may starve the lip seal of required cooling fluid and cause a premature deterioration of the lip seal. However, in a solid oil environment the combination of a carbon seal with pressurized gaseous discharge, fluid contaminant barrier, and a lip seal may be required. It is understood that these combinations are not be construed as limitations and are just examples of carbon seal contaminant barrier systems that can be utilized to enhance the gas turbine engine.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:

a gas turbine engine;

a mechanical housing within said gas turbine engine;

a shaft rotatably mounted within said housing;

a carbon seal connected to said housing;

a seal runner connected to said shaft, said seal runner arranged adjacent to said carbon seal to form a substantially fluid tight seal therebetween;

a lip seal contacting said seal runner; and a baffle spaced from said lip seal and positioned around said seal runner.

2. The combination of claim 1, wherein a portion of said lip seal rides on the outer surface of said seal runner to wipe contaminants away.

3. The combination of claim 2, wherein said lip seal has a l shaped portion.

4. The combination of claim 2, wherein said baffle is spaced axially from said lip seal and radially from said seal runner, and wherein said baffle for minimizing the direct impingement of excited fluid on said lip seal.

5. The combination of claim 2, wherein said baffle is formed of sheet metal and has anti-rotation means for preventing rotation of the baffle relative to said housing.

6. The combination of claim 1, which further includes an annular radial passageway between said baffle and said seal runner leading into an annular cavity around said seal runner, said annular radial passageway being smaller than said annular cavity.

7. The combination of claim 6, wherein said baffle has an opening therein for allowing fluid drainage from said annular cavity.

8. The combination of claim 6, wherein said annular cavity for retaining fluids to cool said lip seal.

9. The combination of claim 1, which further includes means for discharging pressurized gas against said lip seal for reducing the load on said shaft.

10. The combination of claim 1, wherein said carbon seal and said seal runner are axially concentric, and wherein said surface disposed adjacent each other for forming said substantially fluid tight seal.

11. The combination of claim 10, wherein said carbon seal is defined by an arcuate carbon ring.

12. The combination of claim 11, wherein said seal runner has a circumferential cooling channel formed thereround.

13. In combination:
a gas turbine engine;
a mechanical housing within said gas turbine engine;
a shaft rotatably mounted within said housing;
a first sealing element coupled to said housing;
a second sealing element connected to said shaft, said second sealing element arranged adjacent to said first sealing element to form rubbing interface therebetween; and
a passageway for the delivery of a pressurized gas adjacent said first sealing element to reduce the impingement of a contaminant onto said first sealing element.

14. The combination of claim 13, wherein at least a portion of said passageway along said shaft.

15. The combination of claim 14, wherein said first sealing element is a carbon sealing element and said second sealing element is a seal runner.

16. The combination of claim 15, wherein said carbon seal and said seal runner are axially concentric, and wherein said seal runner and said carbon seal each have a cylindrical surface disposed adjacent each other for forming said rubbing interface.

17. The combination of claim 14, wherein said carbon sealing element has a channel formed therein for fluid flow.

18. The combination of claim 17, wherein said channel is formed substantially circumferential.

19. The combination of claim 17, wherein said carbon sealing element has a radially extending path for allowing the discharge of pressurized gas to the other surface of said seal runner.

20. The combination of claim 19, wherein said carbon sealing element is defined by a plurality of arcuate adjoining members, and wherein said radially extending path is formed between a pair of said plurality of arcuate adjoining members.

21. In combination:
a gas turbine engine;
a mechanical housing within said gas turbine engine;
a shaft rotatably mounted within said housing;
a first sealing element coupled to said housing;
a second sealing element connected to said shaft, said second sealing element arranged adjacent to said first sealing element to form rubbing interface therebetween;
a third sealing element positioned adjacent said second sealing element for substantially reducing the flow of a contaminant to said first sealing element; and
a baffle connecting to said housing and positioned radially from said second sealing element for reducing the impingement of the contaminant on said third sealing element.

22. The combination of claim 21, wherein said third sealing element is a windback.

23. The combination of claim 22, wherein said windback has only one thread.

24. The combination of claim 22, wherein said first sealing element is a carbon seal and said second sealing element is a seal runner, said carbon sealing element and said seal runner being axially concentric.

25. The combination of claim 22, wherein:
said windback has only one thread;
which further includes an annular radial passageway between said baffle and said second sealing element leading to an annular cavity disposed around said second sealing element, said annular radial passageway being smaller than said annular cavity;
said baffle formed of sheet metal and further including an opening therethrough for the passage of fluid from said annular cavity during shut down of said gas turbine engine; and
said first sealing element is a carbon seal and said second sealing element is a seal runner, said carbon sealing element and said seal runner are axially concentric.

26. The combination of claim 21, which further includes an annular radial passageway between said baffle and said second sealing element leading to an annular cavity disposed around said second sealing element, said annular radial passageway being smaller than said annular cavity.

27. The combination of claim 26, wherein said baffle is sheet metal, and said baffle further including an opening therethrough for the drainage of fluid said annular cavity during the shut down of said gas turbine engine.

28. In combination:
a gas turbine engine;
a mechanical housing within said gas turbine engine;
a shaft rotatably mounted within said housing;
a first sealing element coupled to said housing;
a second sealing element connected to said shaft, said second sealing element arranged adjacent to said first sealing element to form rubbing interface therebetween; and
a lip seal arranged adjacent said first sealing element to form a rubbing interface with said second sealing element, said lip seal wiping the outer surface of said second sealing element to reduce the flow of a fluid to said first sealing element.

29. The combination of claim 28, which further includes a passageway around said second sealing element and in fluid communication with said lip seal, said passageway having a narrowed portion for calming the flow of fluid prior to impingement upon said lip seal.

30. The combination of claim 28, wherein said first sealing element is a carbon seal and said second sealing element is a seal runner, said carbon sealing element and said seal runner being axially concentric.

31. The combination of claim 30, wherein said lip seal having a l shaped portion.

32. The combination of claim 31, wherein wherein said lip seal has pressurized gas discharged thereagainst for reducing said lip seal's load on said shaft.

33. The combination of claim 28, wherein said third sealing element is windback.

34. The combination of 33, wherein said windback having about one thread.

35. In combination:
a gas turbine engine;
a mechanical housing within said gas turbine engine;
a shaft rotatable within said housing;
a carbon sealing element coupled to said housing;
a seal runner coupled to said shaft and being positioned adjacent said carbon sealing element to form a substantially fluid tight seal therebetween; and
an annular member spaced from said carbon sealing element and around said seal runner so as to limit the passage of contaminants to said carbon seal without causing contaminants to be pulled back into said carbon seal.

* * * * *

UNITED STATES PATENT AND TRADEMARK OFFICE
CERTIFICATE OF CORRECTION

PATENT NO : 5,813,830
DATED : September 29, 1998
INVENTOR(S): Joseph C. Smith et al.

It is certified that error appears in the above-identified patent and that said Letters Patent is hereby corrected as shown below:

In col. 7, line 28, before "surface" please insert: --seal runner and said carbon seal each have a cylindrical--.

In col. 7, line 61, please change "other" to --outer--.

In col. 8, line 48, please insert --from-- after "fluid".

In col. 9, line 13, please insert --a-- after "is".

Signed and Sealed this

Twenty-third Day of February, 1999

Q. TODD DICKINSON

Attest:

Attesting Officer

Acting Commissioner of Patents and Trademarks